United States Patent
Du et al.

(10) Patent No.: US 9,578,597 B2
(45) Date of Patent: Feb. 21, 2017

(54) EXTENDED ACCESS BARRING FOR CSG CELLS

(75) Inventors: Lei Du, Beijing (CN); Benoist Pierre Sebire, Tokyo (JP); Guillaume Decarreau, Beijing (CN)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/401,093

(22) PCT Filed: May 14, 2012

(86) PCT No.: PCT/CN2012/075461
§ 371 (c)(1),
(2), (4) Date: Dec. 30, 2014

(87) PCT Pub. No.: WO2013/170424
PCT Pub. Date: Nov. 21, 2013

(65) Prior Publication Data
US 2015/0141007 A1    May 21, 2015

(51) Int. Cl.
*H04W 4/00* (2009.01)
*H04W 48/16* (2009.01)
*H04W 48/06* (2009.01)

(52) U.S. Cl.
CPC ............. *H04W 48/16* (2013.01); *H04W 48/06* (2013.01)

(58) Field of Classification Search
CPC ............................... H04W 48/06; H04W 48/16
USPC .................. 455/418–422.1, 434–453, 456.1, 456.3,455/41.1–41.2, 509, 67.11, 552.1; 370/322, 370/324, 328–338, 341–344
See application file for complete search history.

(56) References Cited

U.S. PATENT DOCUMENTS

| | | | |
|---|---|---|---|
| 8,478,286 B1* | 7/2013 | Fan | H04W 72/0446 455/410 |
| 2009/0104905 A1* | 4/2009 | DiGirolamo | H04J 11/0093 455/434 |
| 2009/0270104 A1* | 10/2009 | Du | H04W 48/02 455/436 |

(Continued)

FOREIGN PATENT DOCUMENTS

CN        101651975 A        2/2010

OTHER PUBLICATIONS

International Search Report and Written Opinion for International Application No. PCT/CN2012/075461, mailed Feb. 14, 2013, 10 pages.

(Continued)

*Primary Examiner* — Babar Sarwar
(74) *Attorney, Agent, or Firm* — Brake Hughes Bellermann LLP

(57) ABSTRACT

It is provided an apparatus, comprising CSG (closed subscriber group) determining means adapted to determine one of plural CSG types to which the apparatus belongs, based on a CSG entry stored by the apparatus, wherein the plural CSG types are related to a closed subscriber group advertisement received from a cell of a base station; selecting means adapted to select one of plural EAB (extended access barring) parameter sets based on the determined one of the plural CSG types, wherein the plural EAB parameter sets are received from the cell and wherein each of the plural EAB parameter sets is related to one of the plural CSG types; applying means adapted to apply extended access barring to an access of the apparatus to the cell based on the selected EAB parameter set.

12 Claims, 3 Drawing Sheets

(56) References Cited

U.S. PATENT DOCUMENTS

| | | | |
|---|---|---|---|
| 2009/0274050 A1 | 11/2009 | Johansson et al. | |
| 2013/0044702 A1* | 2/2013 | Jayaraman | H04W 48/06 370/329 |
| 2013/0045706 A1* | 2/2013 | Hsu | H04W 4/005 455/404.1 |
| 2013/0051325 A1* | 2/2013 | Ryu | H04W 74/0833 370/328 |
| 2013/0170479 A1* | 7/2013 | Fong | H04W 72/0446 370/336 |
| 2014/0128029 A1* | 5/2014 | Fong | H04W 48/12 455/411 |
| 2014/0171061 A1* | 6/2014 | Larmo | H04W 74/006 455/422.1 |
| 2014/0315554 A1* | 10/2014 | Hapsari | H04W 48/02 455/436 |
| 2016/0037556 A1* | 2/2016 | Kim | H04W 48/06 370/336 |

OTHER PUBLICATIONS

3GPP TS 22.220 V9.4.0 (Mar. 2010); 3rd Generation Partnership Project; Technical Specification Group Services and System Aspects; Service requirements for Home Node B (HNB) and Home eNode B (HeNB) (Release 9).
3GPP TS 22.011 V11.2.0 (Dec. 2011); 3rd Generation Partnership Project; Technical Specification Group Services and System Aspects; Service accessibility (Release 11).
3GPP TS 22.368 V10.1.0 (Jun. 2010); 3rd Generation Partnership Project; Technical Specification Group Services and System Aspects; Service requirements for Machine-Type Communications (MTC); Stage 1 (Release 10).
RP-111373; Huawei; "New WI proposal: RAN overload control for Machine-Type Communications"; 3GPP TSG-RAN #53; Fukuoka, Japan, Sep. 13-16, 2011.
3GPP TS 22.011 V10.3.0 (Mar. 2011); 3rd Generation Partnership Project; Technical Specification Group Services and System Aspects; Service accessibility (Release 10).
3GPP TR 37.868 V0.6.3 (Oct. 2010); 3rd Generation Partnership Project; Technical Specification Group Radio Access Network; Study on RAN Improvements for Machine-type Communications; (Release 10); (R2-106028).
3GPP TS 36.331 V10.1.0 (Mar. 2011); 3rd Generation Partnership Project; Technical Specification Group Radio Access Network; Evolved Universal Terrestrial Radio Access (E-UTRA); Radio Resource Control (RRC); Protocol specification (Release 10).
3GPP TS 22.220 V11.3.0 (Sep. 2011); 3rd Generation Partnership Project; Technical Specification Group Services and System Aspects; Service requirements for Home Node B (HNB) and Home eNode B (HeNB) (Release 11).
3GPP TS 24.008 V10.2.0 (Mar. 2011); 3rd Generation Partnership Project; Technical Specification Group Core Network and Terminals; Mobile radio interface Layer 3 specification; Core network protocols; Stage 3 (Release 10).
R2-111918; ZTE; "Extended Access Barring for delay tolerant devices"; 3GPP TSG-RAN WG2 meeting #73bis; Shanghai, China, Apr. 11-15, 2011.
R2-113339; LG Electronics Inc.; "Further Discussion on EAB"; 3GPP TSG-RAN WG2 #74; Barcelona, Spain, May 9-13, 2011.
R2-113217; Intel Corporation; "EAB for RAN overload protection"; 3GPP TSG RAN WG2 Meeting #74; Barcelona, Spain, May 9-May 13, 2011.
R2-113030; Ericsson, ST-Ericsson; "Extended access barring for MTC devices"; 3GPP TSG-RAN WG2 #74; Barcelona, Spain, May 9-13, 2011.
3GPP TS 22.011 V11.4.0 (Dec. 2014); 3rd Generation Partnership Project; Technical Specification Group Services and System Aspects; Service accessibility (Release 11).
R2-116527; ETSI MCC; "Report of 3GPP TSG RAN WG2 meeting #75bis"; 3GPP TSG-RAN Working Group 2 meeting #76; San Francisco, USA, Nov. 14-18, 2011.
European Search Report for European Application 12876769.6, mailed on Jul. 6, 2016, 13 pages.
3rd Generation Partnership Project; Technical Specification Group Services and System Aspects; Service accessibility (Release 11); 3GPP Standard; 3GPP TS 22.011; vol. SA WG1, No. V11.2.0, Dec. 21, 2011, pp. 1-26, XP050555030.
3rd Generation Partnership Project. Service requirements for Home Node B (HNB) and Home eNode B (HeNB) (Release 9). 3GPP Standard; 3GPP TS 22.220, No. V9.4.0, Mar. 31, 2010, pp. 1-22, XP050402164.
ZTE: "Discussion on fast method for dynamic access control", 3GPP Draft; R2-112865; vol. RAN WG2, No. Barcelona, Spain; May 9, 2011, May 3, 2011, XP050495267.
CATT: "EAB SIB Design for RAN Sharing", 3GPP Draft; R2-121195, vol. RAN WG2, No. Jeju, Korea; Mar. 26, 2012-Mar. 30, 2012, Mar. 20, 2012, XP050606198, 6 pages.
Huawei, et al., "Further Consideration on EAB", 3GPP Draft; R2-112951; vol. RAN WG2, No. Barcelona, Spain; May 9, 2011, May 1, 2011, XP050494960., 2 pages.

* cited by examiner

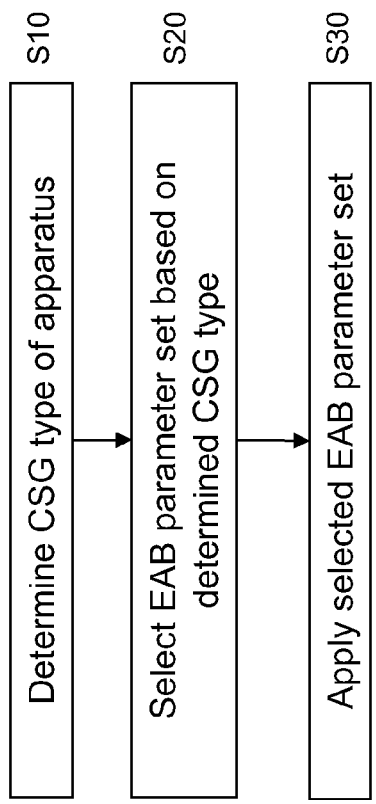
Fig. 3
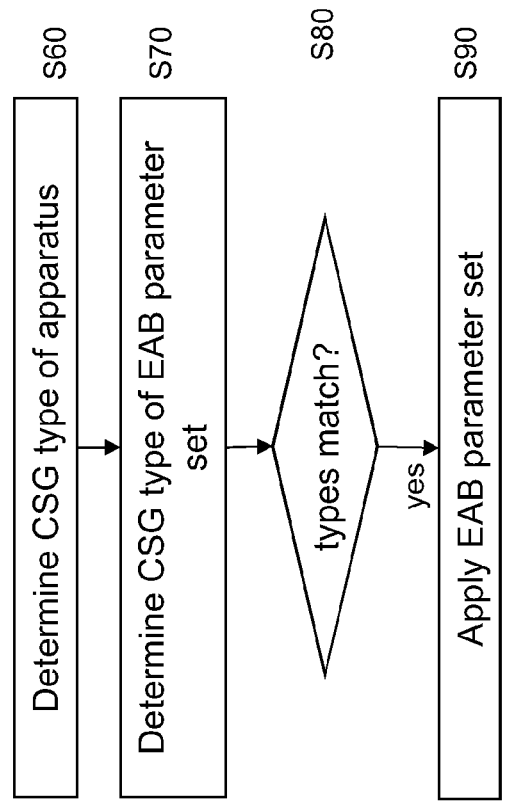
Fig. 5
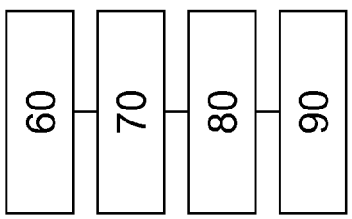
Fig. 2
Fig. 4

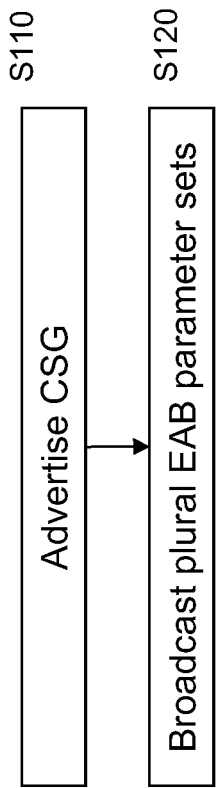
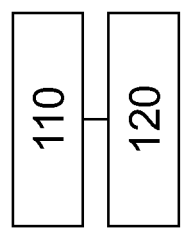
Fig. 6
Fig. 7
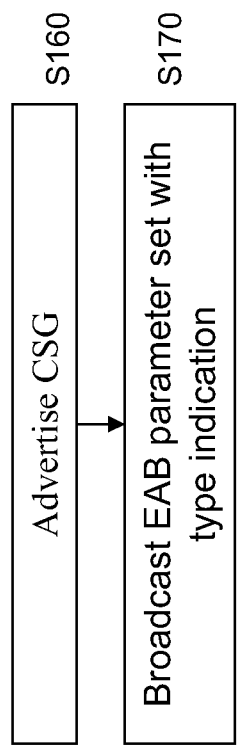
Fig. 8
Fig. 9

EXTENDED ACCESS BARRING FOR CSG CELLS

This application is a national stage entry of PCT Application No. PCT/CN2012/075461, filed on May 14, 2012, entitled "EXTENDED ACCESS BARRING FOR CSG CELLS", which is hereby incorporated by reference in its entirety.

FIELD OF THE INVENTION

The present invention relates to an apparatus, a method, a system, and a computer program product related to extended access barring. More particularly, the present invention relates to an apparatus, a method, a system, and a computer program product for extended access barring in case of a closed subscriber group.

BACKGROUND OF THE INVENTION

Abbreviations

3GPP $3^{rd}$ generation partnership project
AC Access Class
ACB Access Class Barring
AS Access Stratum
CN Core network
CSG Closed subscriber group
E-UTRAN Evolved UTRAN
eNodeB, eNB Evolved NodeB
EAB Extended Access Barring
EDGE Enhanced Data Rates for GSM Evolution
GERAN GSM Edge RAN
GPS Global positioning system
GSM Global system for mobile communication
HeNB Home eNodeB
HNB Home NodeB
HPLMN Home PLMN
IE Information element
MO Mobile originating
MTC Machine Type Communication
NAS Non Access Stratum
PLMN Public Land Mobile Network
RAN Radio Access Network
Rel Release
SA Service architecture
SIB System Information Block
UE User equipment (same as terminal)
UTRAN Universal Terrestrial Radio Access Network
WI Work item The present application is related to extended access barring (EAB). 3GPP is discussing EAB as a means to bar the UEs in overload situations. The requirements are captured in 3GPP TS 22.011 V11.4.0. (chapter 4.3.4).

Machine Type Communication (MTC) is a form of data communication which involves one or more entities that do not necessarily need human interaction. They are associated with specific MTC features, e.g. a large number of devices, small data transmission, low mobility etc. [1] In order to better adapt to the MTC communication, a Work Item (WI) is ongoing in 3GPP discussing the RAN optimization for MTC where RAN overload control is focused [2].

Up to now, RAN2 agreed that Extension of Access Barring (EAB) based on SA1 requirements will be introduced as the baseline for RAN overload control in Rel-11 [3]. Accordingly, the EAB category information cited below shall be advertised to UEs, as agreed in RAN2 75bis meeting [4].

EAB information shall define whether EAB applies to UEs within one of the following EAB categories (hereinafter sometimes referred to as categories):
 a) UEs that are configured for EAB;
 b) UEs that are configured for EAB and are neither in their HPLMN nor in a PLMN that is equivalent to it;
 c) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN It is agreed to have one set of parameters (10 bit, i.e., one bit per access class)+2 bit to indicate whether the parameters apply to category a), b), or c).

There were some discussions on how to implement EAB in 3GPP [9-12]. The main focus is whether EAB should be handled in AS or NAS, which SIB message to include EAB, how to update EAB etc. However, EAB in CSG scenarios has not been discussed yet.

[1] 3GPP TS 22.368 v10.1.0, Service requirements for Machine-Type Communications;
[2] RP-111373, RAN overload control for Machine-Type Communications;
[3] 3GPP TS 22.011 v10.3.0, Service accessibility;
[4] RAN2#75bis chairman notes;
[5] R2-106028, Study on RAN Improvements for Machine-type Communications;
[6] 3GPP TS 36.331 v10.1.0, Radio Resource Control (RRC), Protocol specification;
[7] 3GPP TS 22.220 V11.3.0 Service requirements for Home Node B (HNB) and Home eNode B (HeNB);
[8] 3GPP TS 24.008 V10.2.0 (2011-03) Mobile radio interface Layer 3 specification; Core network protocols; Stage 3;
[9] R2-111918, Extended Access Barring for delay tolerant devices, ZTE;
[10] R2-113339, Further discussion on EAB, LG Electronics Inc.;
[11] R2-113217, Enhancement of EAB for RAN overload protection, Intel Corporation; [12] R2-113030, Extended access barring for MTC devices, Ericsson, ST-Ericsson.

SUMMARY OF THE INVENTION

It is an object of the present invention to improve the prior art.

According to a first aspect of the invention, there is provided an apparatus, comprising CSG determining means adapted to determine one of plural CSG types to which the apparatus belongs, based on a CSG entry stored by the apparatus, wherein the plural CSG types are related to a closed subscriber group advertisement received from a cell of a base station; selecting means adapted to select one of plural EAB parameter sets based on the determined one of the plural CSG types, wherein the plural EAB parameter sets are received from the cell and wherein each of the plural EAB parameter sets is related to one of the plural CSG types; applying means adapted to apply extended access barring to an access of the apparatus to the cell based on the selected EAB parameter set.

According to a second aspect of the invention, there is provided an apparatus, comprising CSG determining means adapted to determine one of plural CSG types to which the apparatus belongs, based on a CSG entry stored by the apparatus, wherein the plural CSG types are related to a closed subscriber group advertisement received from a cell of a base station; CSG evaluating means adapted to evaluate a CSG type indication comprised in an EAB parameter set to obtain a CSG type of the EAB parameter set, wherein the EAB parameter set is received from the cell; checking means adapted to check if the CSG type of the apparatus corresponds to the CSG type of the EAB parameter set; applying means adapted to apply extended access barring to an access of the apparatus to the cell based on the EAB parameter set if a result of the checking by the checking means is affirmative.

The apparatus may further comprise PLMN determining means adapted to determine, based on a home network of the apparatus, if the apparatus belongs to one of plural categories related to a network indication received from the cell; PLMN evaluating means adapted to evaluate a category indication additionally comprised in the EAB parameter set to obtain a category of the EAB parameter set; PLMN checking means adapted to check if the category of the apparatus corresponds to the category of the EAB parameter set; wherein the applying means may be adapted to apply extended access barring to the access of the apparatus to the cell based on the EAB parameter set if the result of the checking by the checking means is affirmative and the result of the checking by the PLMN checking means is affirmative.

The apparatus according to any of the first and second aspects may further comprise PLMN determining means adapted to determine, based on a home network of the apparatus, if the apparatus belongs to one of plural categories related to a network indication received from the cell; PLMN evaluating means adapted to evaluate a category indication comprised in a PLMN-EAB parameter set to obtain a category of the PLMN-EAB parameter set, wherein the PLMN-EAB parameter set is received from the cell; PLMN checking means adapted to check if the category of the apparatus corresponds to the category of the PLMN-EAB parameter set; wherein the applying means is additionally adapted to apply extended access barring to the access of the apparatus to the cell based on the PLMN-EAB parameter set if the result of the checking by the PLMN checking means is affirmative.

In the apparatus according to any of the first and second aspects, the applying means may be adapted to apply extended access barring to the access based on the EAB parameter set if the closed subscriber group advertisement is received, and to apply extended access barring to the access based on the PLMN-EAB parameter set if the closed subscriber advertisement is not received.

The apparatus according to any of the first and second aspects may further comprise indication checking means adapted to check, based on a CSG-EAB indication, whether a received parameter set comprising the CSG-EAB indication is an EAB parameter set or a PLMN-EAB parameter set, wherein the applying means may be adapted to apply extended access barring to the access based on the EAB parameter set if the CSG-EAB indication is received, and to apply extended access barring to the access based on the PLMN-EAB parameter set if the CSG-EAB indication is not received.

In the apparatus according to any of the first and second aspects, the applying means may be further adapted to apply extended access barring to the access based on the EAB parameter set and the PLMN-EAB parameter set if the closed subscriber group advertisement is received.

The apparatus according to any of the first and second aspects may further comprise prioritizing means adapted to prioritize one of the EAB parameter set and the PLMN-EAB parameter set based on a priority indication received from the cell; wherein the applying means may be adapted to apply extended access barring to the access of the apparatus to the cell based only on the prioritized one of the EAB parameter set and the PLMN-EAB parameter set.

In the apparatus according to any of the first and second aspects, the plural CSG types may comprise a first and a second CSG type, wherein the first CSG type comprises that the apparatus is configured for extended access barring, and the second CSG type comprises that the apparatus is configured for extended access barring and is not a member of the closed subscriber group, In the apparatus according to any of the first and second aspects, the plural CSG types may comprise a third CSG type, and the third CSG type comprises that the apparatus is configured for extended access barring and is a guest member of the closed subscriber group, wherein a guest member is only temporarily included in the closed subscriber group.

In the apparatus according to any of the first and second aspects, the plural CSG types may comprise a fourth CSG type, wherein the fourth CSG type comprises that the apparatus is not a member of the closed user group.

According to a third aspect of the invention, there is provided an apparatus, comprising CSG determining processor adapted to determine one of plural CSG types to which the apparatus belongs, based on a CSG entry stored by the apparatus, wherein the plural CSG types are related to a closed subscriber group advertisement received from a cell of a base station; selecting processor adapted to select one of plural EAB parameter sets based on the determined one of the plural CSG types, wherein the plural EAB parameter sets are received from the cell and wherein each of the plural EAB parameter sets is related to one of the plural CSG types; applying processor adapted to apply extended access barring to an access of the apparatus to the cell based on the selected EAB parameter set.

According to a fourth aspect of the invention, there is provided an apparatus, comprising CSG determining processor adapted to determine one of plural CSG types to which the apparatus belongs, based on a CSG entry stored by the apparatus, wherein the plural CSG types are related to a closed subscriber group advertisement received from a cell of a base station; CSG evaluating processor adapted to evaluate a CSG type indication comprised in an EAB parameter set to obtain a CSG type of the EAB parameter set, wherein the EAB parameter set is received from the cell; checking processor adapted to check if the CSG type of the apparatus corresponds to the CSG type of the EAB parameter set; applying processor adapted to apply extended access barring to an access of the apparatus to the cell based on the EAB parameter set if a result of the checking by the checking processor is affirmative.

The apparatus may further comprise PLMN determining processor adapted to determine, based on a home network of the apparatus, if the apparatus belongs to one of plural categories related to a network indication received from the cell; PLMN evaluating processor adapted to evaluate a category indication additionally comprised in the EAB parameter set to obtain a category of the EAB parameter set; PLMN checking processor adapted to check if the category of the apparatus corresponds to the category of the EAB parameter set; wherein the applying processor may be adapted to apply extended access barring to the access of the apparatus to the cell based on the EAB parameter set if the result of the checking by the checking processor is affirmative and the result of the checking by the PLMN checking processor is affirmative.

The apparatus according to any of the third and fourth aspects may further comprise PLMN determining processor adapted to determine, based on a home network of the apparatus, if the apparatus belongs to one of plural categories related to a network indication received from the cell; PLMN evaluating processor adapted to evaluate a category indication comprised in a PLMN-EAB parameter set to obtain a category of the PLMN-EAB parameter set, wherein the PLMN-EAB parameter set is received from the cell; PLMN checking processor adapted to check if the category of the apparatus corresponds to the category of the PLMN-EAB parameter set; wherein the applying processor is additionally adapted to apply extended access barring to the access of the apparatus to the cell based on the PLMN-EAB parameter set if the result of the checking by the PLMN checking processor is affirmative.

In the apparatus according to any of the third and fourth aspects, the applying processor may be adapted to apply extended access barring to the access based on the EAB parameter set if the closed subscriber group advertisement is received, and to apply extended access barring to the access based on the PLMN-EAB parameter set if the closed subscriber advertisement is not received.

The apparatus according to any of the third and fourth aspects may further comprise indication checking processor adapted to check, based on a CSG-EAB indication, whether a received parameter set comprising the CSG-EAB indication is an EAB parameter set or a PLMN-EAB parameter set, wherein the applying processor may be adapted to apply extended access barring to the access based on the EAB parameter set if the CSG-EAB indication is received, and to apply extended access barring to the access based on the PLMN-EAB parameter set if the CSG-EAB indication is not received.

In the apparatus according to any of the third and fourth aspects, the applying processor may be further adapted to apply extended access barring to the access based on the EAB parameter set and the PLMN-EAB parameter set if the closed subscriber group advertisement is received.

The apparatus according to any of the third and fourth aspects may further comprise prioritizing processor adapted to prioritize one of the EAB parameter set and the PLMN-EAB parameter set based on a priority indication received from the cell; wherein the applying processor may be adapted to apply extended access barring to the access of the apparatus to the cell based only on the prioritized one of the EAB parameter set and the PLMN-EAB parameter set.

In the apparatus according to any of the third and fourth aspects, the plural CSG types may comprise a first and a second CSG type, wherein the first CSG type comprises that the apparatus is configured for extended access barring, and the second CSG type comprises that the apparatus is configured for extended access barring and is not a member of the closed subscriber group, In the apparatus according to any of the third and fourth aspects, the plural CSG types may comprise a third CSG type, and the third CSG type comprises that the apparatus is configured for extended access barring and is a guest member of the closed subscriber group, wherein a guest member is only temporarily included in the closed subscriber group.

In the apparatus according to any of the third and fourth aspects, the plural CSG types may comprise a fourth CSG type, wherein the fourth CSG type comprises that the apparatus is not a member of the closed user group.

According to a fifth aspect of the invention, there is provided an apparatus, comprising advertising means adapted to advertise a closed subscriber group of the apparatus; broadcasting means adapted to broadcast plural EAB parameter sets each related to one of plural CSG types, wherein the plural CSG types are related to the closed subscriber group.

According to a sixth aspect of the invention, there is provided an apparatus, comprising advertising means adapted to advertise a closed subscriber group of the apparatus; broadcasting means adapted to broadcast an EAB parameter set comprising one of plural CSG type indications, wherein each of the plural CSG type indications corresponds to a respective one of plural CSG types, and wherein the plural CSG types are related to the closed subscriber group.

In the apparatus, the broadcasting means may be adapted to broadcast the EAB parameter set additionally comprising one of plural category indications, wherein each or the plural category indications is related to a roaming status.

The apparatus according to any of the fifth and sixth aspects may further comprise providing means adapted to provide a CSG-EAB indication if an EAB parameter set comprising the CSG type indication is to be broadcast, wherein the broadcasting means may be further adapted to broadcast the CSG-EAB indication together with the EAB parameter set.

The apparatus according to any of the fifth and sixth aspects may further comprise evaluating means adapted to evaluate if a user equipment attempting to access the apparatus belongs to the closed subscriber group; and group policy applying means adapted to apply a group policy to the access attempt of the user equipment, wherein the group policy is based on the closed subscriber group.

The apparatus according to any of the fifth and sixth aspects may further comprise priority providing means adapted to provide a priority indication indicating a priority of one of extended access barring based on the CSG types and extended access barring based on PLMN categories.

In the apparatus according to any of the fifth and sixth aspects, the plural CSG types may comprise a first and a second CSG type, wherein the first CSG type comprises that a user equipment receiving the advertising of the closed user group is configured for extended access barring, and the second CSG type comprises that the user equipment is configured for extended access barring and not a member of the closed subscriber group.

In the apparatus according to any of the fifth and sixth aspects, the plural CSG types may comprise a third CSG type, and the third CSG type comprises that the user equipment is configured for extended access barring and is a guest member of the closed subscriber group, wherein a guest member is only temporarily included in the closed subscriber group.

In the apparatus according to any of the fifth and sixth aspects, the plural CSG types may comprise a fourth CSG type, wherein the fourth CSG type comprises that the user equipment is not a member of the closed user group.

According to a seventh aspect of the invention, there is provided an apparatus, comprising advertising processor adapted to advertise a closed subscriber group of the apparatus; broadcasting processor adapted to broadcast plural EAB parameter sets each related to one of plural CSG types, wherein the plural CSG types are related to the closed subscriber group.

According to an eighth aspect of the invention, there is provided an apparatus, comprising advertising processor adapted to advertise a closed subscriber group of the apparatus; broadcasting processor adapted to broadcast an EAB parameter set comprising one of plural CSG type indications, wherein each of the plural CSG type indications corresponds to a respective one of plural CSG types, and wherein the plural CSG types are related to the closed subscriber group.

In the apparatus, the broadcasting processor may be adapted to broadcast the EAB parameter set additionally comprising one of plural category indications, wherein each or the plural category indications is related to a roaming status.

The apparatus according to any of the seventh and eighth aspects may further comprise providing processor adapted to provide a CSG-EAB indication if an EAB parameter set comprising the CSG type indication is to be broadcast, wherein the broadcasting processor may be further adapted to broadcast the CSG-EAB indication together with the EAB parameter set.

The apparatus according to any of the seventh and eighth aspects may further comprise evaluating processor adapted to evaluate if a user equipment attempting to access the apparatus belongs to the closed subscriber group; and group policy applying processor adapted to apply a group policy to the access attempt of the user equipment, wherein the group policy is based on the closed subscriber group.

The apparatus according to any of the seventh and eighth aspects may further comprise priority providing processor adapted to provide a priority indication indicating a priority of one of extended access barring based on the CSG types and extended access barring based on PLMN categories.

In the apparatus according to any of the seventh and eighth aspects, the plural CSG types may comprise a first and a second CSG type, wherein the first CSG type comprises that a user equipment receiving the advertising of the closed user group is configured for extended access barring, and the second CSG type comprises that the user equipment is configured for extended access barring and not a member of the closed subscriber group.

In the apparatus according to any of the seventh and eighth aspects, the plural CSG types may comprise a third CSG type, and the third CSG type comprises that the user equipment is configured for extended access barring and is a guest member of the closed subscriber group, wherein a guest member is only temporarily included in the closed subscriber group.

In the apparatus according to any of the seventh and eighth aspects, the plural CSG types may comprise a fourth CSG type, wherein the fourth CSG type comprises that the user equipment is not a member of the closed user group.

According to a ninth aspect of the invention, there is provided a method, comprising determining one of plural CSG types to which an apparatus performing the method belongs, based on a CSG entry stored by the apparatus, wherein the plural CSG types are related to a closed subscriber group advertisement received from a cell of a base station; selecting one of plural EAB parameter sets based on the determined one of the plural CSG types, wherein the plural EAB parameter sets are received from the cell and wherein each of the plural EAB parameter sets is related to one of the plural CSG types; applying extended access barring to an access of the apparatus to the cell based on the selected EAB parameter set.

According to a tenth aspect of the invention, there is provided a method, comprising determining one of plural CSG types to which an apparatus performing the method belongs, based on a CSG entry stored by the apparatus, wherein the plural CSG types are related to a closed subscriber group advertisement received from a cell of a base station; evaluating a CSG type indication comprised in an EAB parameter set to obtain a CSG type of the EAB parameter set, wherein the EAB parameter set is received from the cell; checking if the CSG type of the apparatus corresponds to the CSG type of the EAB parameter set; applying extended access barring to an access of the apparatus to the cell based on the EAB parameter set if a result of the checking is affirmative.

The method may further comprise determining, based on a home network of the apparatus, if the apparatus belongs to one of plural categories related to a network indication received from the cell; evaluating a category indication additionally comprised in the EAB parameter set to obtain a category of the EAB parameter set; checking if the category of the apparatus corresponds to the category of the EAB parameter set; applying extended access barring to the access of the apparatus to the cell based on the EAB parameter set if the result of the checking of the CSG type is affirmative and the result of the checking of the category is affirmative.

The method according to any of the ninth and tenth aspects may be a method of access barring.

The method according to any of the ninth and tenth aspects may further comprise determining, based on a home network of the apparatus, if the apparatus belongs to one of plural categories related to a network indication received from the cell; evaluating a category indication comprised in a PLMN-EAB parameter set to obtain a category of the PLMN-EAB parameter set, wherein the PLMN-EAB parameter set is received from the cell; checking if the category of the apparatus corresponds to the category of the PLMN-EAB parameter set; applying extended access barring to the access of the apparatus to the cell based on the PLMN-EAB parameter set if the result of the checking is affirmative.

In the method according to any of the ninth and tenth aspects, the applying may comprise applying extended access barring to the access based on the EAB parameter set if the closed subscriber group advertisement is received, and applying extended access barring to the access based on the PLMN-EAB parameter set if the closed subscriber advertisement is not received.

The method according to any of the ninth and tenth aspects may further comprise checking, based on a CSG-EAB indication, whether a received parameter set comprising the CSG-EAB indication is an EAB parameter set or a PLMN-EAB parameter set, wherein the applying may comprise applying extended access barring to the access based on the EAB parameter set if the CSG-EAB indication is received, and applying extended access barring to the access based on the PLMN-EAB parameter set if the CSG-EAB indication is not received.

In the method according to any of the ninth and tenth aspects, the applying may comprise applying extended access barring to the access based on the EAB parameter set and the PLMN-EAB parameter set if the closed subscriber group advertisement is received.

The method according to any of the ninth and tenth aspects may further comprise prioritizing one of the EAB parameter set and the PLMN-EAB parameter set based on a priority indication received from the cell; wherein the applying may comprise applying extended access barring to the access of the apparatus to the cell based only on the prioritized one of the EAB parameter set and the PLMN-EAB parameter set.

In the method according to any of the ninth and tenth aspects, the plural CSG types may comprise a first and a second CSG type, wherein the first CSG type comprises that the apparatus is configured for extended access barring, and the second CSG type comprises that the apparatus is configured for extended access barring and is not a member of the closed subscriber group.

In the method according to any of the ninth and tenth aspects, the plural CSG types may comprise a third CSG type, and the third CSG type comprises that the apparatus is configured for extended access barring and is a guest member of the closed subscriber group, wherein a guest member is only temporarily included in the closed subscriber group.

In the method according to any of the ninth and tenth aspects, the plural CSG types may comprise a fourth CSG type, wherein the fourth CSG type comprises that the apparatus is not a member of the closed user group.

According to an eleventh aspect of the invention, there is provided a method, comprising advertising a closed subscriber group of an apparatus performing the method; broadcasting plural EAB parameter sets each related to one of plural CSG types, wherein the plural CSG types are related to the closed subscriber group.

According to a twelfth aspect of the invention, there is provided a method, comprising advertising a closed subscriber group of an apparatus performing the method; broadcasting an EAB parameter set comprising one of plural CSG type indications, wherein each of the plural CSG type indications corresponds to a respective one of plural CSG types, and wherein the plural CSG types are related to the closed subscriber group.

In the method, the broadcasting may comprise broadcasting the EAB parameter set additionally comprising one of plural category indications, wherein each or the plural category indications is related to a roaming status.

The method according to any of the eleventh and twelfth aspects may be a method of access barring.

The method according to any of the eleventh and twelfth aspects may further comprise providing a CSG-EAB indication if an EAB parameter set comprising the CSG type indication is to be broadcast, wherein the broadcasting may comprise broadcasting the CSG-EAB indication together with the EAB parameter set.

The method according to any of the eleventh and twelfth aspects may further comprise evaluating if a user equipment attempting to access the apparatus belongs to the closed subscriber group; and applying a group policy to the access attempt of the user equipment, wherein the group policy is based on the closed subscriber group.

The method according to any of the eleventh and twelfth aspects may further comprise providing a priority indication indicating a priority of one of extended access barring based on the CSG types and extended access barring based on PLMN categories.

In the method according to any of the eleventh and twelfth aspects, the plural CSG types may comprise a first and a second CSG type, wherein the first CSG type comprises that a user equipment receiving the advertising of the closed user group is configured for extended access barring, and the second CSG type comprises that the user equipment is configured for extended access barring and not a member of the closed subscriber group.

In the method according to any of the eleventh and twelfth aspects, the plural CSG types may comprise a third CSG type, and the third CSG type comprises that the user equipment is configured for extended access barring and is a guest member of the closed subscriber group, wherein a guest member is only temporarily included in the closed subscriber group.

In the method according to any of the eleventh and twelfth aspects, the plural CSG types may comprise a fourth CSG type, wherein the fourth CSG type comprises that the user equipment is not a member of the closed user group.

According to a thirteenth aspect of the invention, there is provided a computer program product including a program comprising software code portions being arranged, when run on a processor of an apparatus, to perform the method according to any one of the ninth to twelfth aspects.

The computer program product may comprise a computer-readable medium on which the software code portions are stored, and/or the program may be directly loadable into a memory of the processor.

According to embodiments of the invention, at least the following advantages are achieved:

Overload in the RAN may be efficiently mitigated according to the defined categories also in case of closed subscriber group. In particular, an inconsistency between the priorities set by the operator for EAB (based on the network of the UE) and the priorities set by the operator with respect to the closed subscriber group may be avoided. E.g., one of these priorities may overrule the other, or a joint consideration of both priorities may be performed. Thus, flexibility of the operator is enhanced.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein

FIG. 2 shows an apparatus according to an embodiment of the invention;

FIG. 3 shows a method according to an embodiment of the invention;

FIG. 4 shows an apparatus according to an embodiment of the invention;

FIG. 5 shows a method according to an embodiment of the invention;

FIG. 6 shows an apparatus according to an embodiment of the invention;

FIG. 7 shows a method according to an embodiment of the invention;

FIG. 8 shows an apparatus according to an embodiment of the invention; and

FIG. 9 shows a method according to an embodiment of the invention.

DETAILED DESCRIPTION OF CERTAIN EMBODIMENTS

Figure 1:
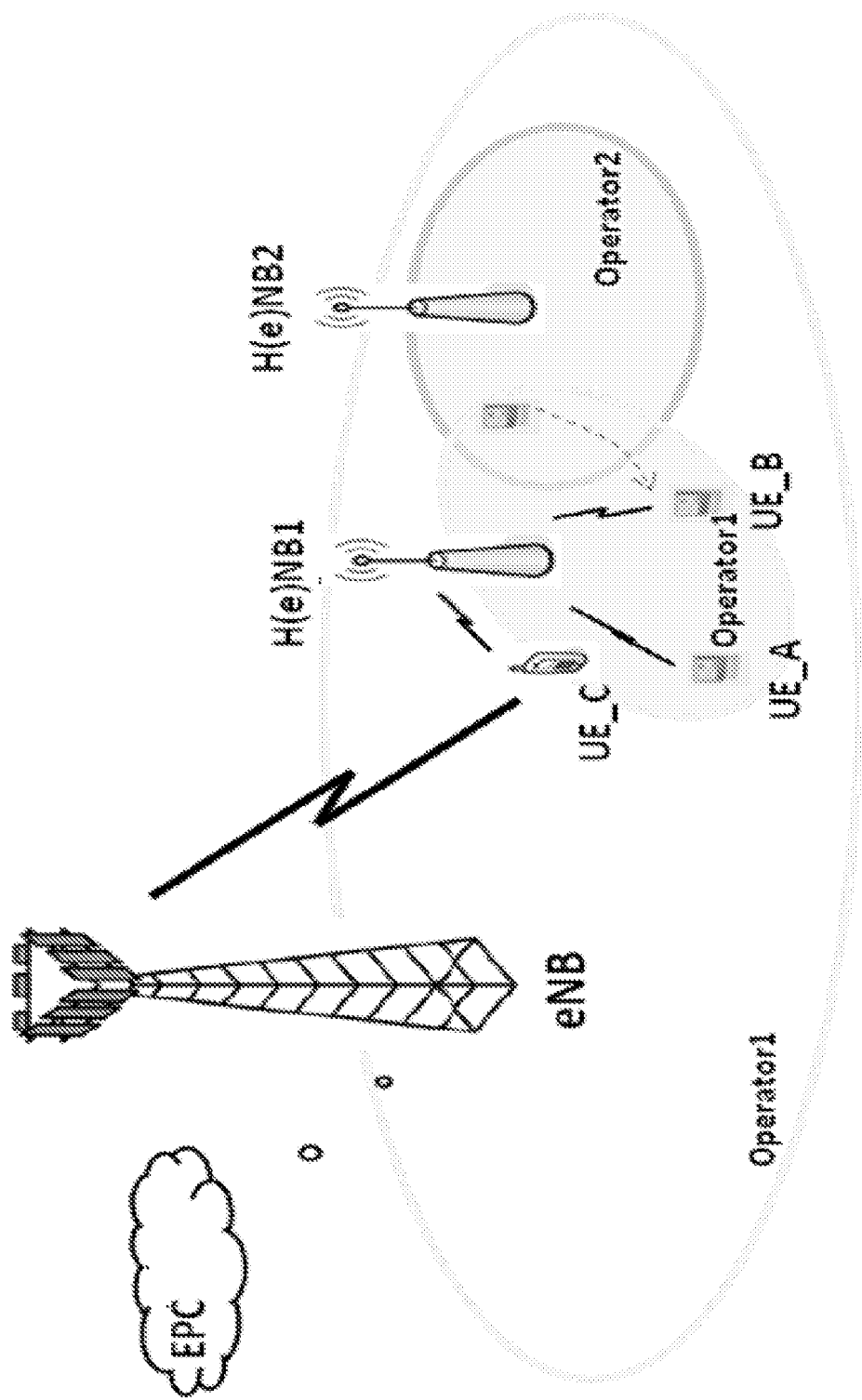
FIG. 1 shows an exemplary network with a CSG cell and different UE types.

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

A scenario is considered where e.g. MTC devices are deployed in HeNB/HNB. For example, the devices, including digital photo frames, digital cameras, eBook readers, personal computers, telephones, televisions, and GPS automotive navigation systems among others, are embedded with communication modules, and can be used to upload and download online content such as pictures, electronic books, and firmware upgrades, for instance [5]. Considering that the H(e)NB provides services either only to a Closed Subscriber Group (CSG) or to other mobile subscribers too, the existing EAB is insufficient in case of a CSG cell as will be shown hereinafter:

In order to identify that one cell is a CSG cell and to indicate the access mode, the CSG related parameters, csg-indication and csg-identity are advertised in SIB1 [6].

When a CSG cell is configured for closed access mode, i.e. csg-indication is set to TRUE, only users that belong to its associated CSG (i.e. CSG members) shall be able to obtain services. When a CSG cell is configured for hybrid access mode, i.e. csg-indication set to FALSE and csg-identity is still available, it shall be allowed for the H(e)NB to provide services not only to its associated CSG members, but also to subscribers of any PLMN not belonging to its associated CSG, subject to roaming agreement.

When examining the UEs that could be served by a CSG cell, the following types of UEs are identified, referring to FIG. 1. For the below description, a UE is considered as "CSG member" if the csg-identity matches an entry in the CSG whitelist (e.g. "Allowed CSG list" and/or "Operator CSG list") stored in the UE.

1. Home CSG members (UE_A in FIG. 1): UEs that are CSG members and belonging to the hosting party of the CSG cell. For example, it could be the "lead" user in a household, or the corporate IT manager in an enterprise context.

2. Guest CSG members (UE_B in FIG. 1): UEs that are temporary CSG members. They may or may not belong to the hosting party of the CSG cell. A use case specified in [7] provides a good example of this type of UEs:

Usecase (H(e)NB Guest Users, see FIG. 1):

User A and User B are subscribers of Operator 1 and Operator 2, respectively. User B visits User A in his home and User A allows User B to use H(e)NB in User A's home. User B should be able to access all the services he is subscribed to from Operator 1 based on the policies set by User A and operator 1. Operator 1 and Operator 2 have a roaming agreement. In this use case, User A is considered as Home CSG member i.e. UE_A in FIG. 1. User B is a Guest CSG member which equalizes to UE_B in FIG. 1.

Hereinafter, home CSG members and guest CSG members are jointly referred to as CSG members.

3. Non-CSG members (if CSG cell is configured to hybrid/open access mode; UE_C in FIG. 1): UEs that are not CSG members of the CSG cell.

Since a CSG cell is supposed to prioritize the services to its CSG members, when RAN overload occurs due to a large number of MTCs accessing to the CSG cell, non-CSG members should be barred first if the CSG cell is configured to hybrid/open access mode, and, if insufficient, the guest CSG members may be blocked as well, to ensure the connectivity of home CSG members. The latters may be finally blocked, too.

However, current EAB mechanisms differentiate the barring level in terms of roaming policy. According to conventional EAB mechanisms, a guest CSG member that belongs to a different PLMN e.g. User B in above use case, is barred prior to non-CSG members belonging to the same PLMN as the CSG cell.

FIG. 1 shows an example of these types of UEs and problem of applying existing EAB. H(e)NB1 and H(e)NB2 are two CSG cells belonging to different PLMNs and the two PLMNs are not equivalent PLMNs to each other. eNB is with the same operator and PLMN as H(e)NB1 (operator 1). Assume that UE_A is Home CSG member of H(e)NB1 (belonging to the PLMN of H(e)NB1 and being a member of its CSG), UE_B is Home CSG member of H(e)NB2 (belonging to the PLMN of H(e)NB2 and being a member of its CSG) and is temporarily added to the CSG member of H(e)NB1 by UE_A becoming a guest CSG member of H(e)NB1, and UE_C is non-CSG member of H(e)NB1 (belonging to the PLMN of H(e)NB1, but not being its CSG member).

If conventional EAB (PLMN based EAB) is applied in H(e)NB1, and it indicates "category b": all the "UEs that are configured for EAB and are neither in their HPLMN nor in a PLMN that is equivalent to it" shall be barred, in the example of FIG. 1 UE_B shall be barred and UE_C shall not be barred.

However, according to the CSG prioritization policy, the CSG members shall be prioritized over non-CSG members, i.e. UE_C shall be barred prior to UE_B. Therefore, conventionally, there is a mismatch between EAB prioritization and CSG prioritization for access control.

According to embodiments of the invention, in a CSG cell, it is defined to which CSG type(s) of UEs (i.e. CSG members (in some cases distinguishing home CSG members and guest CSG members) and non-CSG members) EAB is applied. The information about the applicable CSG types may be provided along with EAB information, e.g. (an) EAB parameter set(s) for different access classes.

According to some embodiments of the invention, the CSG type based EAB information may override conventional (PLMN based) EAB category based information. In some embodiments, CSG type based EAB information and PLMN based EAB information may be used in combination if both are indicated by the CSG cell. E.g. UE performs CSG type based EAB checking followed by PLMN based EAB checking. E.g. barring may only be performed if both checkings indicate that EAB is to be applied, or barring may be performed, if either one of the checkings indicates that EAB is to be applied.

According to some embodiments of the invention, the cell may provide a priority indication indicating that either one of CSG type based EAB or PLMN category based EAB has prevalence over the other one. In this case, an UE decides on EAB to be performed based on the EAB parameter set of the prioritized type/category only.

According to some implementations, CSG type based EAB information may be explicitly advertised from a CSG cell. Alternatively, an UE may translate the EAB category autonomously to CSG type when it camps on a CSG cell.

According to embodiments of the invention, the CSG type based EAB information may be:

Alternative 1: EAB parameters for different CSG types respectively. According to this alternative, each EAB parameter comprises a barring information per access class such as the 10-bit per AC barring information, but now related to CSG types. It does not comprise a CSG type indication. In some embodiments, it may additionally comprise a category indication related to the PLMN based access barring.

E.g., the (e)NB provides one set of parameters (10 bit, i.e., one bit per access class) for CSG members and one set of parameters (10 bit, i.e., one bit per access class) for non-CSG members. Or, in some embodiments, the (e)NB provides one set of parameters (10 bit, i.e., one bit per access class) for Home CSG members, one set of parameters (10 bit, i.e., one bit per access class) for guest CSG members, and one set of parameters (10 bit, i.e., one bit per access class) for non-CSG members.

Alternative 2: EAB parameters+CSG type indication.

E.g., the (e)NB provides one set of parameters (10 bit, i.e., one bit per access class)+1-bit or 2-bit CSG type indication, where an example of the indicated CSG types may be:

(a) UEs that are configured for EAB
(b) UEs that are configured for EAB and are not home CSG members, i.e. either non-CSG member or guest CSG member.
(c) UEs that are configured for EAB and are not CSG members, i.e. non-CSG member.

Another example of the indicated CSG types could be:
(a) non home CSG members, i.e. either non-CSG member or guest CSG member
(b) non-CSG members.

Still another example of the indicated CSG types could be:
(a) UEs that are configured for EAB;
(b) UEs that are configured for EAB and non-CSG members.

Alternative 3: EAB parameters+EAB category indication+CSG type indication.

E.g., the (e)NB provides one set of parameters (10 bit, i.e., one bit per access class)+2-bit EAB category indication+1-bit or 2-bit CSG type indication, where an example of the indicated CSG types may be the same as mentioned with respect to Alternative 2.

According to some embodiments of the invention, it is not distinguished between home CSG members and guest CSG members. Both of them are CSG members, which may be distinguished from non-CSG members in a CSG cells operating in hybrid/open mode. In this case, the CSG types (a) and (c) in Alternatives 2 and 3 may be set to "non-CSG members" indicating EAB is applied to non-CSG members only.

The CSG type indication may comprise 1 bit if no distinction is made between home CSG members and guest CSG members, and 2 bits if such distinction is made.

The selection between the alternatives may depend on the granularity a CSG cell is expecting to achieve.

FIG. 2 shows an apparatus according to an embodiment of the invention. The apparatus may be a terminal such as a user equipment. FIG. 3 shows a method according to an embodiment of the invention. The apparatus according to FIG. 2 may perform the method of FIG. 3 but is not limited to this method. The method of FIG. 3 may be performed by the apparatus of FIG. 2 but is not limited to being performed by this apparatus.

The apparatus comprises CSG determining means 10, selecting means 20, and applying means 30.

The CSG determining means 10 determines to which of plural CSG types the user equipment (or—more generally: the apparatus) belongs (S10). The determining is based on a CSG entry stored by the apparatus, that is an entry indicating to which CSG the apparatus belongs. Furthermore, the determining is based on a closed subscriber group advertisement received from a cell of a base station. Typically, the closed subscriber group advertisement comprises an indication of the CSG(s) of the cell and the identity of the CSG(s) of the cell. CSG types could be e.g. the types mentioned hereinabove under (a) to (c).

The selecting means 20 selects one of plural EAB parameter sets based on the determined one of the plural CSG types (S20). The plural EAB parameter sets are received from the cell. Each of the plural EAB parameter sets is related to one of the plural CSG types. That is, different EAB parameter sets may be provided for the respective types, cf. Alternative 1 mentioned hereinabove.

The applying means 30 applies extended access barring to an access of the apparatus to the cell based on the selected EAB parameter set.

FIG. 4 shows an apparatus according to an embodiment of the invention. The apparatus may be a terminal such as a user equipment. FIG. 5 shows a method according to an embodiment of the invention. The apparatus according to FIG. 4 may perform the method of FIG. 5 but is not limited to this method. The method of FIG. 5 may be performed by the apparatus of FIG. 4 but is not limited to being performed by this apparatus.

The apparatus comprises CSG determining means 60, CSG evaluating means 70, checking means 80, and applying means 90.

The CSG determining means 60 determines to which of plural CSG types the user equipment (or—more generally: the apparatus) belongs (S60). The determining is based on a CSG entry stored by the apparatus, that is an entry indicating to which CSG the apparatus belongs. In some embodiments, the determining may also be based on the EAB configuration stored by the apparatus and the roaming status, i.e. to which EAB category the apparatus belongs. Furthermore, the determining is based on a closed subscriber group advertisement received from a cell of a base station. Typically, the closed subscriber group advertisement comprises an indication of the CSG(s) of the cell and the identity of the CSG(s) of the cell. CSG types could be e.g. the types mentioned hereinabove under (a) to (c).

The CSG evaluating means 70 evaluates a CSG type indication comprised in an EAB parameter set. Thus, a CSG type of the EAB parameter set is obtained (S70). The EAB parameter set is received from the cell. That is, only one EAB parameter set may be provided for which the CSG type is indicated, cf. Alternative 2 mentioned hereinabove.

The checking means 80 checks if the CSG type of the apparatus as obtained by the determining means 60 corresponds to the CSG type of the EAB parameter set as obtained by the CSG evaluating means 70 (S80). More in detail, it may check whether the CSG type of the apparatus matches the CSG type of the EAB parameter set.

The applying means 90 applies extended access barring to an access to the cell based on the EAB parameter set if a result of the checking by the checking means is affirmative, that is, if the CSG type of the apparatus corresponds to the CSG type of the EAB parameter set (S90).

According to some embodiments of the invention, based on the embodiments of FIGS. 4 and 5, the EAB parameter set comprises additionally a category indication indicating an EAB category. Access barring based on the EAB parameter set is only applied if both the CSG type of the apparatus corresponds to the CSG type of the EAB parameter set and the EAB category of the apparatus corresponds to the EAB category of the EAB parameter set.

FIG. 6 shows an apparatus according to an embodiment of the invention. The apparatus may be a base station or a cell thereof such as a HNodeB or an HeNodeB. FIG. 7 shows a method according to an embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises advertising means 110 and broadcasting means 120.

The advertising means 110 advertises a closed subscriber group of the apparatus (S110). More in detail, it may advertise an identification of the closed subscriber group set up on the apparatus. Typically, the identification comprises csg-indication and csg-identity.

The broadcasting means 120 broadcasts plural EAB parameter sets (S120). Each EAB parameter set is related to one of plural CSG types, wherein the plural CSG types are related to the closed subscriber group. (cf. Alternative 1 hereinabove). CSG types could be e.g. the types mentioned hereinabove under (a) to (c).

FIG. 8 shows an apparatus according to an embodiment of the invention. The apparatus may be a base station or a cell thereof such as a HNodeB or an HeNodeB. FIG. 9 shows a method according to an embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises advertising means 160 and broadcasting means 170.

The advertising means 160 advertises a closed subscriber group of the apparatus (S160). More in detail, it may advertise an identification of the closed subscriber group set up on the apparatus.

The broadcasting means 170 broadcasts an EAB parameter set comprising one of plural CSG type indications (S170) (cf. Alternative 2 hereinabove). Each of the plural CSG type indications corresponds to a respective one of plural CSG types, wherein the plural CSG types are related to the closed subscriber group. CSG types could be e.g. the types mentioned hereinabove under (a) to (c).

In some embodiments, the broadcasted EAB parameter set comprises additionally an EAB category.

Embodiments of the invention are described based on an LTE system but embodiments of the invention may be applied to UMTS or any other radio access network (e.g. GERAN, EDGE) where EAB and closed subscriber group may be employed.

A cell of a base station may have several closed subscriber groups, and a user equipment may belong to several closed subscriber groups.

In some embodiments of the invention, a machine type communication (MTC) device is employed. In other embodiments, any terminal of the respective access technology such as a mobile phone, a laptop, a smart phone, and a user equipment may be employed. For the purpose of the present invention, these terminals are considered to be equivalent, if not otherwise stated.

If not otherwise stated or otherwise made clear from the context, the statement that two entities are different means that they are differently addressed in the mobile network. It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a user equipment, or a component thereof, an apparatus embodying the same, a method for controlling and/or operating the same, and computer program(s) controlling and/or operating the same as well as mediums carrying such computer program(s) and forming computer program product(s). Further exemplary embodiments of the present invention provide, for example a base station or a cell thereof, or a component thereof, an apparatus embodying the same, a method for controlling and/or operating the same, and computer program(s) controlling and/or operating the same as well as mediums carrying such computer program(s) and forming computer program product(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

What is claimed is:

1. A method comprising:
    determining one of plural CSG (closed subscriber group) types to which an apparatus performing the method belongs, based on a CSG entry stored by the apparatus, wherein the plural CSG types are related to a closed subscriber group advertisement of a cell;
    receiving a plural CSG-EAB (extended access barring) parameter sets;
    selecting one of the plural CSG-EAB (extended access barring) parameter sets based on the determined one of the plural CSG types, wherein the plural CSG-EAB parameter sets are received from the cell and wherein each of the plural CSG-EAB parameter sets is related to one of the plural CSG types;
    receiving a public land mobile network (PLMN)-EAB parameter set;
    receiving a priority indication from the cell;
    prioritizing one of the EAB parameter sets, either the selected CSG-EAB parameter set or the received PLMN-EAB parameter set, based on the priority indication; and
    applying extended access barring to the access of the apparatus to the cell based only on the prioritized one of the EAB parameter set.

2. The method according to claim 1, the method further comprising the following if the PLMN-EAB parameter set is prioritized:
    determining, based on a home network of the apparatus, if the apparatus belongs to one of plural categories related to a network indication received from the cell;
    evaluating a category indication comprised in the PLMN-EAB parameter set to obtain a category of the PLMN-EAB parameter set;
    checking if the category of the apparatus corresponds to the category of the PLMN-EAB parameter set; and applying extended access barring to an access of the apparatus to the cell based on the PLMN-EAB parameter set if the result of the checking is affirmative.

3. The method according to claim 1, further comprising: applying extended access barring to the access based on the PLMN-EAB parameter set if the closed subscriber advertisement is not received.

4. The method according to claim 1, wherein the plural CSG types comprise a first and a second CSG type, wherein the first CSG type comprises that the apparatus is configured for extended access barring, and the second CSG type comprises that the apparatus is configured for extended access barring and is not a member of the closed subscriber group.

5. The method according to claim 4, wherein the plural CSG types comprise a third CSG type, and the third CSG type comprises that the apparatus is configured for extended access barring and is a guest member of the closed subscriber group, wherein a guest member is only temporarily included in the closed subscriber group.

6. The method according to claim 1, wherein the plural CSG types comprises a fourth CSG type, wherein the fourth CSG type comprises that the apparatus is not a member of the closed user group.

7. The method of claim 1, wherein if the prioritization is for the CSG-EAB, the method further comprises:
applying extended access barring to an access of the apparatus to the cell based on the selected CSG-EAB parameter set.

8. An apparatus comprising at least one processor and at least one memory including computer instructions, when executed by the at least one processor, cause the apparatus to:
determine one of plural CSG (closed subscriber group) types to which an apparatus performing the method belongs, based on a CSG entry stored by the apparatus, wherein the plural CSG types are related to a closed subscriber group advertisement of a cell;
receive a plural CSG-EAB (extended access barring) parameter sets;
select one of the plural CSG-EAB parameter sets based on the determined one of the plural CSG types, wherein the plural CSG-EAB parameter sets are received from the cell and wherein each of the plural CSG-EAB parameter sets is related to one of the plural CSG types; and
receive a public land mobile network (PLMN)-EAB parameter set;
receive a priority indication from the cell;
prioritize one of the EAB parameter sets, either the selected CSG-EAB parameter set or the received PLMN-EAB parameter set, based on the priority indication; and
apply extended access barring to the access of the apparatus to the cell based only on the prioritized one of the EAB parameter set.

9. A method, comprising:
detecting, by an apparatus, whether or not a closed subscriber group advertisement is received from a cell;
upon detecting that the closed subscriber group advertisement is received, performing the following:
determining one of plural CSG (closed subscriber group) types to which the apparatus belongs based on a CSG entry stored by the apparatus, wherein the plural CSG types are related to the closed subscriber group advertisement;
selecting one of plural CSG-EAB (extended access barring) parameter sets corresponding to the determined CSG type, wherein the plural EAB parameter sets are received from the cell and wherein each of the plural CSG-EAB parameter sets is related to one of the plural CSG types; and
applying extended access barring to an access of the apparatus to the cell based on the selected CSG-EAB parameter set; and
upon detecting that the closed subscriber group advertisement is not received, applying extended access barring to the access based on a PLMN-EAB parameter set, wherein the PLMN-EAB parameter set is received from the cell.

10. The method according to claim 9, further comprising:
checking, based on a CSG-EAB indication, whether a received parameter set comprising the CSG-EAB indication is a CSG-EAB parameter set or a PLMN-EAB parameter set, wherein
the applying comprises applying extended access barring to the access based on the CSG-EAB parameter set if the CSG-EAB indication is received, and applying extended access barring to the access based on the PLMN-EAB parameter set if the CSG-EAB indication is not received.

11. The method according to claim 9, wherein the applying extended access barring based on a PLMN-EAB parameter set comprises:
determining, based on a home network of the apparatus, if the apparatus belongs to one of plural categories related to a network indication received from the cell;
evaluating a category indication comprised in the PLMN-EAB parameter set to obtain a category of the PLMN-EAB parameter set;
checking if the category of the apparatus corresponds to the category of the PLMN-EAB parameter set; and
applying extended access barring to the access of the apparatus to the cell based on the PLMN-EAB parameter set if the result of the checking is affirmative.

12. An apparatus comprising at least one processor and at least one memory including computer instructions, when executed by the at least one processor, cause the apparatus to:
detect whether or not a closed subscriber group advertisement is received from a cell;
upon detecting that the closed subscriber group advertisement is received, cause the apparatus to:
determine one of plural CSG (closed subscriber group) types to which the apparatus belongs based on a CSG entry stored by the apparatus, wherein the plural CSG types are related to the closed subscriber group advertisement;
select one of plural CSG-EAB (extended access barring) parameter sets corresponding to the determined CSG type, wherein the plural EAB parameter sets are received from the cell and wherein each of the plural CSG-EAB parameter sets is related to one of the plural CSG types; and apply extended access barring to an access of the apparatus to the cell based on the selected CSG-EAB parameter set; and upon detecting that the closed subscriber group advertisement is not received,
apply extended access barring to the access based on a PLMN-EAB parameter set, wherein the PLMN-EAB parameter set is received from the cell.

* * * * *

UNITED STATES PATENT AND TRADEMARK OFFICE
CERTIFICATE OF CORRECTION

PATENT NO. : 9,578,597 B2
APPLICATION NO. : 14/401093
DATED : February 21, 2017
INVENTOR(S) : Du et al.

It is certified that error appears in the above-identified patent and that said Letters Patent is hereby corrected as shown below:

In the Claims

In Column 17, Line 25, Claim 7, delete "The method of claim" and insert -- The method according to claim --, therefor.

In Column 18, Line 6, Claim 9, delete "types; and" and insert -- types; --, therefor.

In Column 18, Line 61, Claim 12, delete "received, and" and insert -- received; and --, therefor.

Signed and Sealed this
Twenty-eighth Day of November, 2017

Joseph Matal
*Performing the Functions and Duties of the
Under Secretary of Commerce for Intellectual Property and
Director of the United States Patent and Trademark Office*